United States Patent
Connelly et al.

(10) Patent No.: US 10,846,072 B2
(45) Date of Patent: Nov. 24, 2020

(54) MULTIPLE VIRTUAL MACHINES IN A MOBILE VIRTUALIZATION PLATFORM

(71) Applicant: Comcast Cable Communications, LLC, Philadelphia, PA (US)

(72) Inventors: Michael Connelly, Philadelphia, PA (US); Hari Venkatram Pedaprolu, King of Prussia, PA (US); Bhagabati Prasad Maharana, Bensalem, PA (US); James Tobin, Newton Square, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/863,125

(22) Filed: Jan. 5, 2018

(65) Prior Publication Data

US 2018/0373518 A1 Dec. 27, 2018

Related U.S. Application Data

(63) Continuation of application No. 14/597,361, filed on Jan. 15, 2015, now Pat. No. 9,898,271, which is a continuation of application No. 13/248,841, filed on Sep. 29, 2011, now Pat. No. 8,966,004.

(51) Int. Cl.
| | |
|---|---|
| G06F 15/16 | (2006.01) |
| G06F 8/61 | (2018.01) |
| G06F 9/455 | (2018.01) |
| H04L 29/08 | (2006.01) |
| H04N 21/414 | (2011.01) |
| H04N 21/443 | (2011.01) |
| H04W 88/06 | (2009.01) |
| H04W 4/60 | (2018.01) |

(52) U.S. Cl.
CPC ............ *G06F 8/61* (2013.01); *G06F 9/45558* (2013.01); *H04L 67/10* (2013.01); *G06F 2009/45583* (2013.01); *G06F 2009/45595* (2013.01); *H04N 21/41407* (2013.01); *H04N 21/4437* (2013.01); *H04W 4/60* (2018.02); *H04W 88/06* (2013.01)

(58) Field of Classification Search
CPC .................................................... H04W 36/14
USPC ......................................................... 709/217
See application file for complete search history.

(56) References Cited

U.S. PATENT DOCUMENTS

| | | | | |
|---|---|---|---|---|
| 8,683,496 | B2* | 3/2014 | Reeves | H04L 67/1095 719/319 |
| 9,042,304 | B2* | 5/2015 | Smith | G06Q 30/01 370/328 |
| 9,348,633 | B2* | 5/2016 | Galicia | G06F 9/45537 |
| 9,389,877 | B2* | 7/2016 | Galicia | G06F 9/441 |
| 2006/0123416 | A1* | 6/2006 | Cibrario Bertolotti | G06F 9/45533 718/1 |

(Continued)

*Primary Examiner* — Hamza N Algibhah
(74) *Attorney, Agent, or Firm* — Banner & Witcoff, Ltd.

(57) ABSTRACT

Systems and methods are described for embodiments of a mobile virtualization platform (MVP) that may be embedded in an end user mobile device or comprise part of the firmware loaded on the device. The MVP may implement a thin layer of software embedded on the device to decouple applications and data from the underlying hardware, thus enabling the device to concurrently run multiple operating systems. Furthermore, the MVP may enable applications to run concurrently per each base band.

27 Claims, 6 Drawing Sheets

(56) References Cited

U.S. PATENT DOCUMENTS

| | | | |
|---|---|---|---|
| 2007/0105589 A1* | 5/2007 | Lu | H04W 88/02 455/556.2 |
| 2007/0178935 A1 | 8/2007 | Shim et al. | |
| 2008/0146178 A1* | 6/2008 | Lu | H04B 1/0014 455/187.1 |
| 2008/0299974 A1* | 12/2008 | Lee | H04W 36/0083 455/436 |
| 2009/0075654 A1* | 3/2009 | Lu | H04B 1/0003 455/435.2 |
| 2009/0170519 A1 | 7/2009 | Wilhoite et al. | |
| 2010/0074228 A1 | 3/2010 | Hicks, III et al. | |
| 2010/0097386 A1* | 4/2010 | Kim | G06F 9/5005 345/545 |
| 2010/0333088 A1* | 12/2010 | Rogel | G06F 9/45533 718/1 |
| 2011/0014890 A1* | 1/2011 | Ajram | H02M 3/156 455/299 |
| 2011/0126216 A1* | 5/2011 | Galicia | G06F 9/45533 719/318 |
| 2011/0151871 A1 | 6/2011 | Naqvi et al. | |
| 2011/0151924 A1 | 6/2011 | Miller | |
| 2011/0319089 A1 | 12/2011 | Sharma et al. | |
| 2012/0014271 A1 | 1/2012 | Damenti | |
| 2012/0015651 A1 | 1/2012 | Damenti et al. | |
| 2012/0138685 A1 | 6/2012 | Qu et al. | |
| 2012/0140757 A1* | 6/2012 | Feher | H04M 11/04 370/342 |
| 2012/0188455 A1 | 7/2012 | Tsai | |
| 2012/0307921 A1 | 12/2012 | Ulmer-Moll et al. | |
| 2013/0061250 A1* | 3/2013 | Kothandapani | G06F 9/44 719/320 |

\* cited by examiner

MULTIPLE VIRTUAL MACHINES IN A MOBILE VIRTUALIZATION PLATFORM

This application is a continuation of U.S. application Ser. No. 14/597,361, filed Jan. 15, 2015, which is a continuation application of U.S. application Ser. No. 13/248,841, filed Sep. 29, 2011 (now U.S. Pat. No. 8,966,004, issued Feb. 24, 2015). Each of the above-mentioned patent applications is incorporated by reference herein in its entirety.

BACKGROUND

A large number of people work on the go. The evolution of wireless devices such as laptops, mobile phones, and other portable devices facilitates instantaneous access to a wireless network, such as the Internet, at virtually any location, providing users the mobility to move around within a broad coverage area and still be connected to the network. Recent years have witnessed the development of smart phones and wireless devices that carry data in addition to telephone conversations.

Existing systems, however, may be developed on a single or multi-processor based system with multiple software modules, often integrated as a one monolithic image. Improvements are desirable to support wireless devices and to allow such devices to improve their processing power and capabilities.

SUMMARY

Hence, some aspects of the disclosure relate to methods and systems for a mobile virtualization platform providing virtual segregation and/or concurrent execution of multiple applications on a gateway providing voice, video, and/or data services.

For example, some aspects of the disclosure relate to a method of receiving data sent from a remote content provider system at a wireless mobile device comprising multiple virtual machines. The data may be sent over a first wireless network and get processed by a first virtual machine. Upon the occurrence of particular triggering events, however, the processing may be transferred to another virtual machine. The other virtual machine may receive data over a second wireless network. These and other features are disclosed below.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

The disclosure describes, among other things, a mobile virtualization platform embedded on device hardware such that by providing dedicated and distinct virtual machines for different applications (or a category of applications) on the device, numerous benefits may be achieved. For example such embodiments may help to isolate development, testing and deployment efforts per application (or category of applications).

Figure 1:
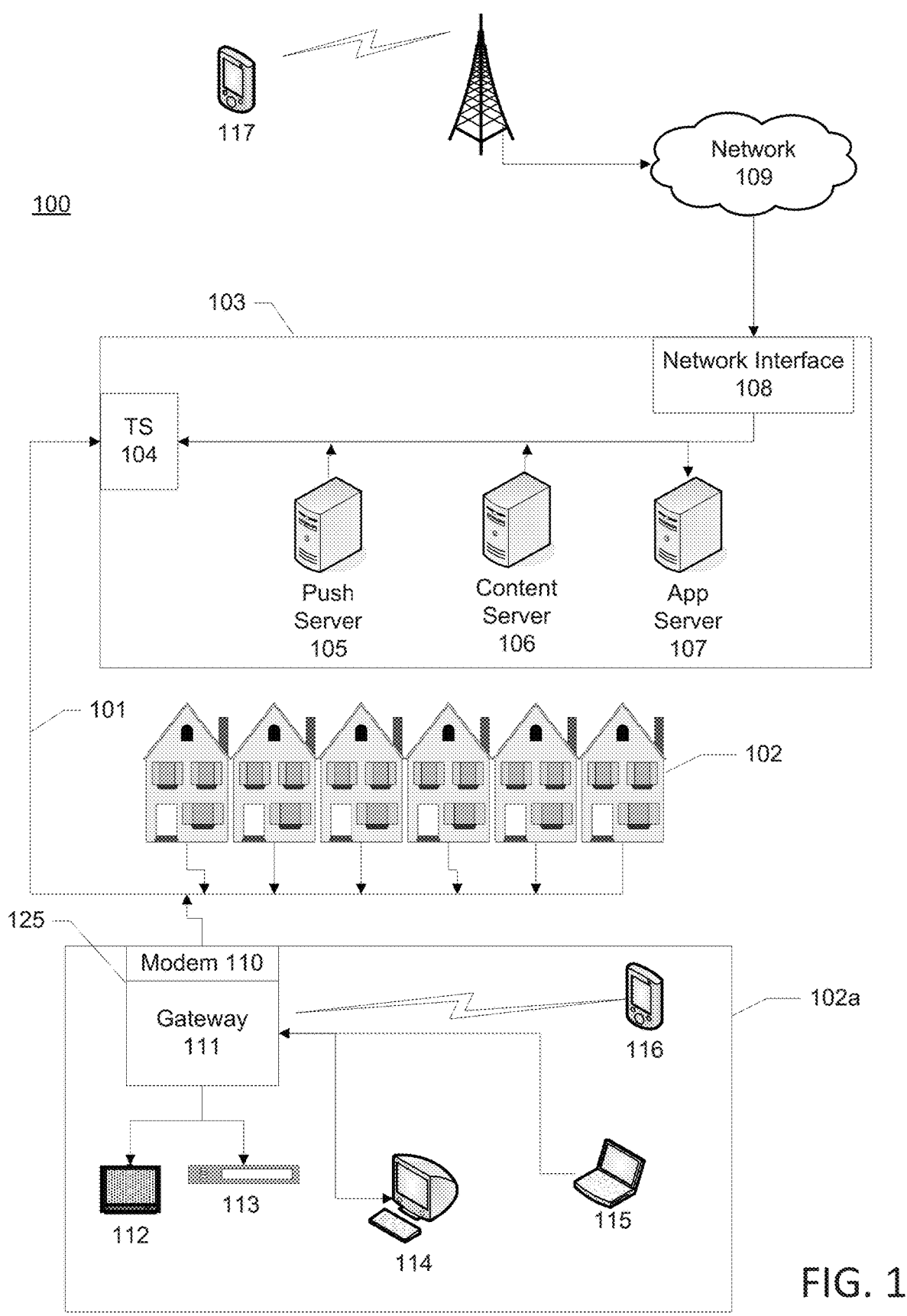
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each home 102 may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even further with its network of lines 101 than before.

The central office 103 may include a termination system (TS) 104, which may comprise a computing device configured to manage communications between devices on the network of lines 101 and backend devices such as servers 105-107. The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by devices at the various homes 102, and to receive upstream communications from those devices on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of computing devices, such as servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, applications, etc. The content server 106 may include software to validate user identities and entitlements, locate and retrieve requested content, encrypt the content, and initiate delivery (e.g., streaming) of the content to the requesting user and/or device. In one example, the content server 106 may, in response to a command, send software application modules to a remote device (e.g., end user mobile device, gateway 111, etc.) for installation and execution on the MVP. One or more of the servers 105-107 described herein may be optionally omitted from or included in the central office 103 in various examples.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the homes 102. Yet another application server may be responsible for receiving user remote control commands, and processing them to provide an intelligent remote control experience.

An example, premises such as a home 102a may include an interface 125. In one example, the interface 125 may comprise a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), a wireless device, or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computing device, such as a server, or any other desired computing device. The gateway 111 may also include (not shown) local network interfaces to provide communication signals to devices, such as televisions 112 in homes, additional STBs 113, personal computers 114 in homes, laptop computers 115, wireless devices 116 (wireless laptops and netbooks, mobile phones, mobile televisions, personal digital assistants (PDA), DECT (Digital Enhanced Cordless Telecommunications) handsets that communicate over a DECT wireless interface, etc.), and/or any other desired devices inside or outside the home. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Gateway 111 may communicate with various elements in a wide area network being external to premises 102. Those elements can include, e.g., call management servers and other conventional network elements used to create and maintain telephone calls and other types of voice communication sessions. External network 109, which may be of regional or national scope, may include a number of sub-networks and/or links to additional networks. For example, network 109 may include an access sub-network that connects gateway 111 (and other gateways at other premises, not shown) to network 109. That access sub-network could be any of various types. Examples of access sub-network types in various embodiments include, but are not limited to, a passive optical network (PON) access sub-network, a digital subscriber line (DSL) access sub-network, a wide area wireless access sub-network and a hybrid fiber coaxial (HFC) access sub-network.

For example, in an HFC access sub-network, a network interface 209 may include hardware for tuning to RF frequency channels, for demodulating signals received in those tuned channels, for outputting data from demodulated signals for further processing, for modulating data onto an upstream signal, and for transmitting that upstream signal to network 109. In a PON access sub-network, a network interface 209 may include the components of an optical network terminal (ONT) that performs modulation, demodulation, transmission, and receiving operations. In a wide area wireless access sub-network, a network interface 209 may include a wireless transceiver that performs tuning, modulation, demodulation, transmission, and receiving operations. In a DSL access sub-network, a network interface 209 may include a DSL modem that performs the modulation, demodulation, transmission, and receiving operations. In still further embodiments, a network interface may include an Ethernet or other local network interface that connects gateway 111 to a separate cable modem, ONT, wireless transceiver, DSL modem or other access sub-network connection point.

Moreover, an access sub-network connecting gateway 111 to network 109 may utilize known media access control (MAC), transport and other communication protocols conventionally used with a particular type of access sub-network architecture and communication technology. Network 109 may include numerous access sub-networks of different types, including those listed above.

Gateway 111 may communicate with different elements in network 109 so as to obtain different types of services. For example, one or more operators of network 109 may provide a general-purpose data service to premises 102 that allows gateway 111 to access the public Internet and/or other public data networks. As another example, the operator of network 109 may provide various types of multicast and/or unicast content (e.g., movies, television programming, etc.) to premises 102 through gateway 111. As a further example, an operator of network 109 may provide telephony or other type of voice communication services to premises 102 through gateway 111.

In addition, a gateway 111 may include a primary/main processor 201 and memory. The processor 201 may communicate with a network 210 over a network interface 209. The processor 201 may be further configured to execute instructions so as to perform various operations as described herein (e.g., operations of a gateway session manager), to perform various operations in connection with MAC, transport and other protocols used for communication with a network 109, and to control operation of other components of gateway 111. Instructions executed by the processor 201 may be hard-wired logic gates and/or may be instructions read from memory. Memory may include volatile and nonvolatile memory and can include any of various types of storage technology, including but not limited to read only memory (ROM) modules 202, random access memory (RAM) modules 203, magnetic tape, magnetic discs (e.g., a fixed hard disk drive 205 or a removable floppy disk 204), optical disk (e.g., a CD-ROM disc, a CD-RW disc, a DVD disc), flash memory, and EEPROM memory. The processor 201 may be implemented with any of numerous types of devices, including but not limited to general purpose microprocessors, application specific integrated circuits, field programmable gate arrays, and combinations thereof. Although a single block is shown for the processor 201, computational operations of gateway 111 may be distributed across multiple processors located within gateway 111. Alternatively, memory and computational operations of gateway 111 may be contained within a single application specific integrated circuit (ASIC) or other component.

In other embodiments, a gateway 111 may also include other types of local physical interfaces for communicating with other types of end devices. Examples of such interfaces include but are not limited to a CAT-iq (Cordless Advanced Technology-Internet and Quality) interface for communication with CAT-iq end devices, a DLNA (Digital Living Network Alliance) interface for communicating with other devices in a premises, a femtocell interface for communicating with mobile telephones and other mobile devices, etc. A power supply and/or battery backup to provide electrical power. User input to gateway 111 may be provided over one of the aforementioned interfaces or via a separate collection of buttons or other controls in a console.

Figure 2:
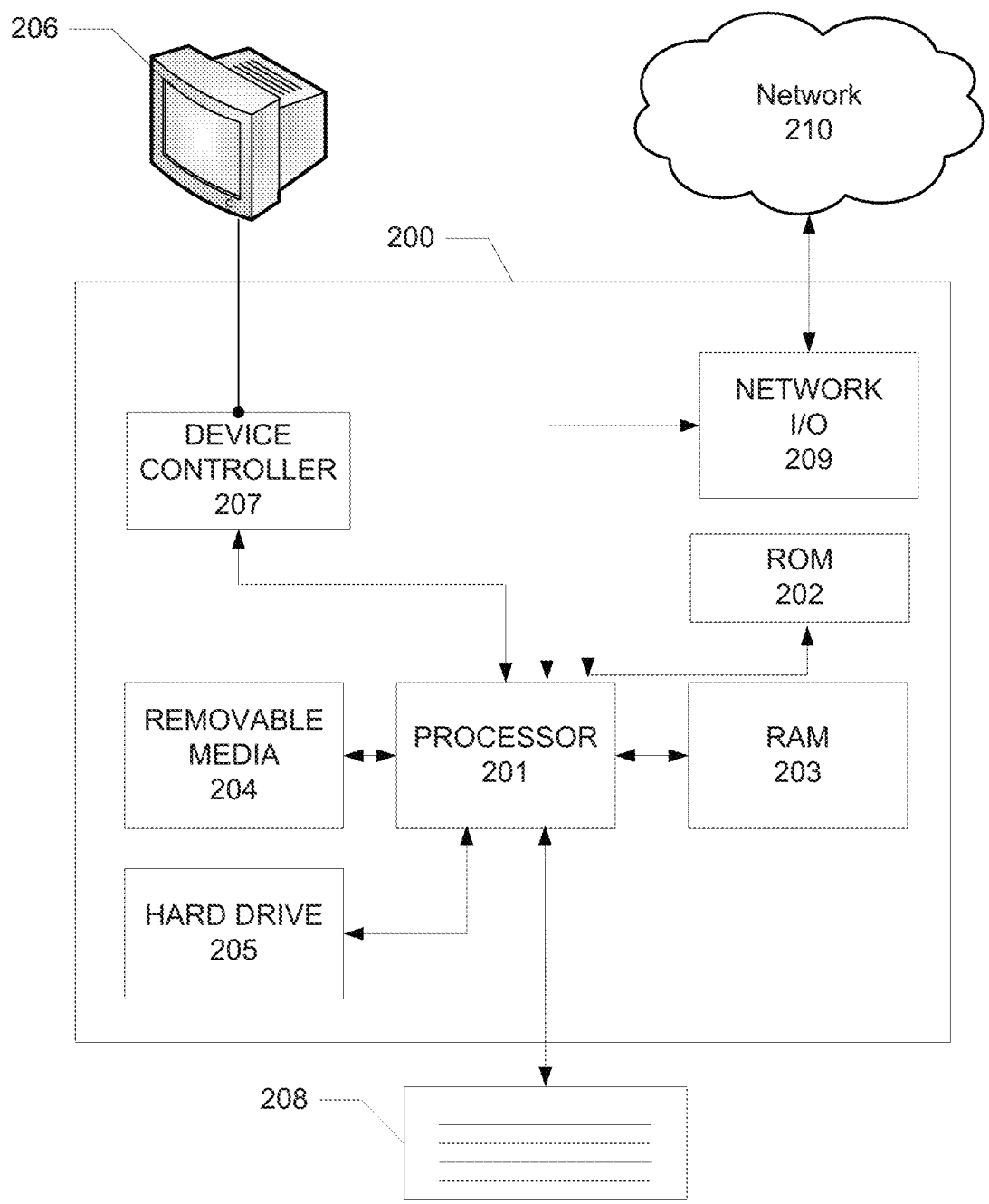
FIG. 2 illustrates an example hardware platform on which some of the elements described herein can be implemented.

FIG. 2 illustrates general hardware elements that may be used to implement any of the various computing devices (e.g., devices 112-117). The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as one or more of a network card, GSM modem, CDMA modem, Bluetooth transceiver, Wi-Fi mode, or other modem type) to communicate with an external network 210. In addition to, or in lieu of, communicating over local area networks (i.e., via a local network interface in the gateway 111), in some embodiments in accordance with aspects of the disclosure, devices 112-117 may communicate over a wide area network with central office 103 without going through the gateway 111.

For example, a mobile phone 117 may communicate, using a GSM modem, with central office 103 without requiring a hotspot gateway, e.g., gateway 111 to provide access to networks. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), and/or any other desired network. One or more of the aforementioned components/interfaces described above may be optional in accordance with various aspects of a particular embodiment.

End device 117 may comprise a smart phone that includes a transceiver used for direct communication over a wide area wireless network (e.g., a 3G mobile networking and telecommunication network, an EDGE (Enhanced Data rate for GSM Evolution) network, an EVDO (EVolution Data Optimized) network. The transceiver demodulates signals received over a wide area wireless network, modulates data, and transmits modulated data signals in the wide area wireless network. A second transceiver may be configured to allow device 117 to communicate within a general-purpose local wireless network. The second transceiver may demodulate signals received in a local wireless network, modulate data, and/or transmit modulated data signals in that local wireless network. Both transceivers may also exchange data with a processor 201 that is configured to execute instructions so as to perform various operations as described herein and to control operation of other components of device 117. Those instructions may be stored in tangible, non-transitory computer memory as executable instructions and/or as hard wired logic within processor 201. For example, the memory or another portion may store a client, such as a SIP-based voice communication client. The client may be, e.g., a VoIP (Voice over Internet Protocol) client. The processor 201 may also be configured to perform one or more types of CODEC operations to convert data to audio for output through speaker and to convert sound received through microphone 208 into data. Processor 201 may outputs video data to a display 206 and receives user input through a keypad 208 and/or through touch sensitive portions of a display. Processor 201 may be configured to provide a browser or other graphical user interface (GUI) on display 206 by which a user of device 200 may receive information. A battery may provide electrical power to device 200.

End device 116 may able to communicate with gateway 111 over a general-purpose, local wireless data interface using a transceiver. Examples of general-purpose wireless data interfaces include interfaces such as are described by Institute of Electrical and Electronics Engineers standard 802.11 (IEEE 802.11). A WiFi interface of gateway 111 and a transceiver of device 116 may be configured for communication over IEEE 802.11 protocols. In other embodiments, the end device may be a laptop computer 115, a tablet computer, or other device having WiFi (or other general-purpose wireless interface) capability.

This disclosure contemplates, among other things, a mobile virtualization platform (MVP) in a mobile device 116 to allow the device to concurrently execute multiple virtual machines. The MVP may allow the mobile device to act independently in different base bands (e.g., GSM, Wi-Fi, WiMax, 4G LTE, etc.) and/or to concurrently maintain multiple services. In some embodiments, the MVP may be embedded in an end user device (e.g., mobile smartphone) or may comprise part of the firmware loaded on the device. For example, the MVP may be provided as part of the operating system of the end user device. In another example, the MVP may implements a thin layer of software that is embedded on the mobile device to decouple applications and data from the underlying hardware. This enables the mobile device to run, if desired, multiple operating systems concurrently on one device. In addition, in some embodiments the MVP may enable applications to run concurrently per each base band.

In addition, a wireless mobile device may use multiple virtual machines to depict multiple personas, as described below. Such operation may reduce cost (for a network operator and/or a user), improve indoor coverage (e.g., by using Wi-Fi instead of 3G when inside a home with a local wireless network), increase data access speeds, and other benefits. For example, using a MVP, a virtual machine may be configured for each baseband of the mobile device. Applications may be executed using each virtual machine (VM) and enable an effective utilization of resources. For example, personas (e.g., profiles) may be created for each base band, such as GSM persona, 4G persona, LTE persona, WiMax persona, Wi-Fi persona, etc., and execution/delivery of applications and interactive content may be within the context of these personas. In some embodiments it may be possible to transition the application status between the VMs or personas and create a seamless transition (or "handoff") between applications such that a user of the mobile device is not interrupted by the change in baseband.

In accordance with various aspects of the disclosure, a mobile device may support a mobile virtualization platform (MVP) layer embedded on the hardware layer of the mobile device. One or more applications may execute on the mobile device by interfacing through the MVP. These applications may communicate with each other via a communication interface such as hypertext transport protocol (HTTP), simple object access protocol (SOAP) messages using extensible markup language (XML), or any other protocols capable of use for inter-process communication between virtual machines. Data used in an application running on one virtual machine may be used in other virtual machines with a seamless handoff between the virtual machines.

Virtual machine and virtual platform as used throughout this disclosure includes aspects of virtual machines as understood by one of ordinary skill in the art, but is also meant to encompass embodiments where an additional layer of software operates between the hardware layer and software application layer. In some examples, this layer of software may receive and execute compiled source code, and is not limited to only receiving bytecode. One example of a commonplace virtual machine is the Java™ virtual machine. Other virtual machines and vendors of virtual machines are known and may be used in accordance with various aspects of the disclosure.

In another aspect, this disclosure also contemplates a virtualization platform that may run dedicated and/or distinct VMs on a service entry device (e.g., residential/commercial wireless gateway device 111). This virtualization platform layer is similar to the MVP described herein and for purposes of this disclosure is also referenced as "MVP," although readers will appreciate that a service entry device might not necessarily be an end-user mobile device, such as a mobile phone. Each application (or a category of applications) may be created and executed in a single VM context. The communication between applications may be treated as inter-VM communication or could be handled by a container VM or MVP. For example, a communication interface such as HTTP or SOAP/XML messages may be used. The aforementioned system of multiple VMs embedded on a service entry device may enable downloading and maintaining of distinct applications per VM module on a single hardware device. The data used in a service running on one VM may be used in other VMs with a seamless handoff between the virtual machines.

In addition the aforementioned embodiment may provide ease of development, testing, and deployment of updates to applications by, for example, launching new VMs or launching updated application versions within an already running VM context. As a result, in one example, this may facilitate a service entry device (e.g., residential wireless gateway) to run a plurality of applications independently without requiring a reinstall of driver data, configuration data, etc. and may recertify the already tested applications whenever updated application versions are released. Various aspects of the disclosure may enable controlling, monitoring, and/or maintaining of different applications via virtual machine modules from the network cloud (e.g., remote system 103). Thus, the modules may provide a mechanism through which to download applications to VM modules on the service entry device via a firmware/software update without disturbing other applications, connected device drivers, and/or other VMs running on the same hardware platform. This may also enable support for network expansion modules without requiring changes to the existing service entry device.

In some embodiments, a gateway 111 (or another device such as an interface device) may support a virtualization platform layer embedded on its hardware layer. The gateway 111 and may include a set of design considerations for executing multiple applications in different virtual machine context in, for example, an embedded system on a hardware platform. At least one benefit of such a configuration is that change to any one application does not require re-certification of the whole module, thus saving time and effort. Each application executed on the gateway 111 may accept individual settings, certifications, code, implementation specifics and related data. Each application module may be implemented as a unique monolithic code block, such as a voice-over-IP (VoIP) module, advanced services module, Wi-Fi module, router module, residential gateway applications module, etc. based on the functionality of the application. For example, each module may run in a VM context and multiple VMs may be running concurrently on the hardware platform. When a new application is executed, the corresponding VM may initiate the application enabling speedy deployment with reduced complexities. Thus, each VM may be able to act independent of each other thus reducing dependency on other applications. As a result, gateway devices and the network may have greater capabilities and provide more feature rich application services with multiple applications co-residing on a single gateway.

One or more services may execute on the gateway by interfacing through the MVP. Similar to the embodiment described herein involving a mobile device, these services may communicate with each other via a communication interface such as HTTP, SOAP/XML messages, or any other protocols capable of use with inter-process communication between virtual machines. As such, the data used in a service running on one virtual machine may be used in other virtual machines with a seamless handoff between the virtual machines. Some examples of types of services corresponding to virtual machines in a MVP in a gateway 111 include, but are not limited to home gateway services, Wi-Fi services, EMTA services, and advanced services. While the example above refers to a gateway device 111, the disclosure is applicable to any service entry device which can run multiple applications concurrently.

In one embodiment in accordance with various aspects of the disclosure, a MVP in an end device 116 may implement one or more virtual machines (VMs) per baseband network (e.g., GSM, Wi-Fi, WiMax, EDGE, 3G, 4G, Bluetooth™, etc.) Applications may run in the VM context and utilize the resources available in that base band. At least some advantages of using a Wi-Fi network over a 3G network when in the vicinity of a WLAN are at least as follows: the cost of VoIP call may be less as compared to GSM; network congestion seen in peak hours could be avoided; GSM/CDMA/3G coverage would keep the user connected all the time when away from urban areas or Wi-Fi Hot Spots; the VoIP call control would have similar features of call connection, call waiting, call forward, call barring, caller ID, Prefix dialing, etc.; additional features of VCC (Voice Call Continuity) settings such as Wi-Fi Range Band, Preferred Call Connection (GSM or VoIP), etc.; and data access speeds are much faster using WLAN, with decreased cost as well. Moreover, other networks and network types may correspond to the one or more VMs. For example, a short-range wireless network, such as Bluetooth™, may include other wireless networks with a range of less than approximately 800 meters. Meanwhile, cellular networks may include, but are not limited to, GSM, EDGE, CDMA, and other wireless network standards for mobile device communication.

Figure 3:
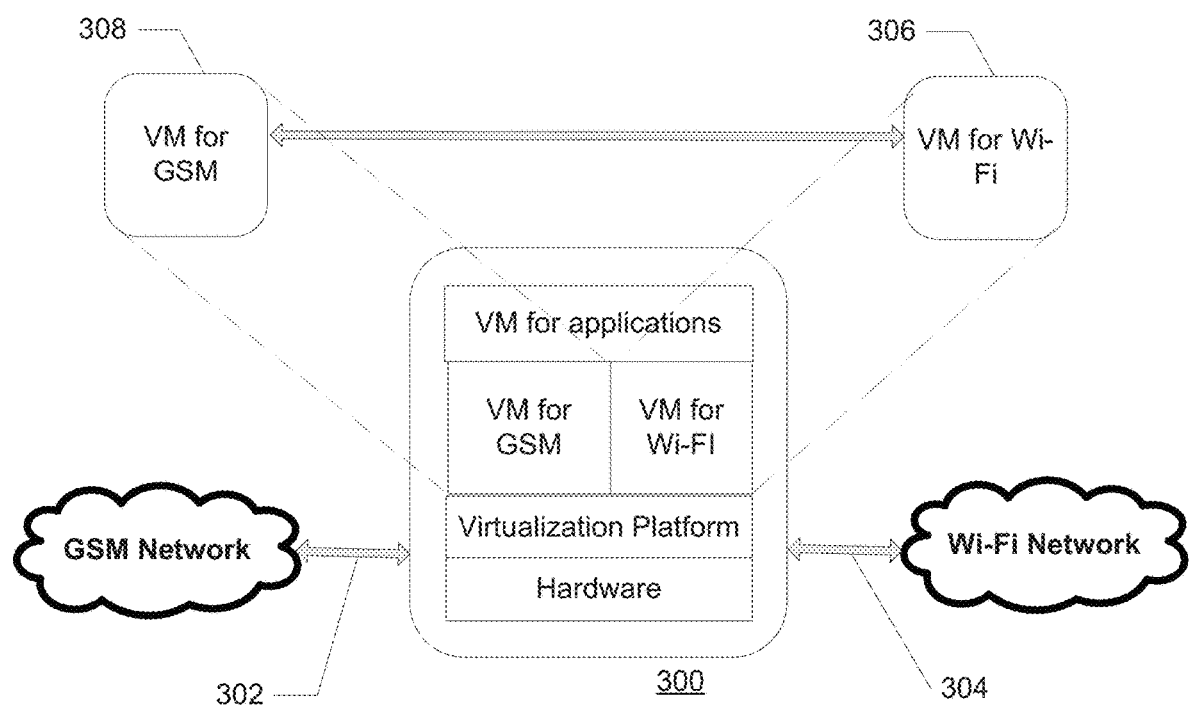
FIG. 3 illustrate a functional block diagram of communication between various components of a mobile virtualization platform (MVP) in accordance with one or more aspects of the disclosure.

FIG. 3 shows an illustrative MVP architecture 300 corresponding to an embodiment with a VM per base band in a mobile platform architecture. For example, there may be one or more applications running in a Wi-Fi VM context 306 and another set of applications running in a GSM VM context 308. Communication between the two VM contexts may assist in coordinating the enabling and disabling of applications in particular contexts. Some exemplary applications on the GSM VM context 308 include, but are not limited to, downloading headers, playing content, using 3G/GSM for voice calls, and using mobile network for data communication. Some exemplary applications on the Wi-Fi context 306 include, but are not limited to, downloading content, using Wi-Fi for voice-over-IP (VoIP) calls, and Wi-Fi backhaul connections.

In one example, assuming the cost of using a GSM backhaul 302 is higher than Wi-Fi, an automatic seamless handoff may be performed when a Wi-Fi network 304 is within the range for initiating a voice call. Similarly, when a end user device is on a GSM call and comes in the vicinity of a Wi-Fi network, the device may connect to the Wi-Fi access point and make a seamless switch from GSM to VoIP (via Wi-Fi) without any user intervention. In fact, the user operating the end device may be unaware that a network switch has occurred. In other embodiments, the user may receive a passive notification (e.g., a textbox may appear on the device's display for a couple seconds indicating the switchover and then automatically disappear.)

Applications running on an end device (e.g., a user's mobile phone) in certain base bands may use considerably less resources than others. For example, when the end device is outside Wi-Fi premises, it may use a mobile 3G network to transmit and receive voice data (e.g., for a voice call.) In such instances, applications, in some embodiments, may download just headers (or other similar type of metadata-like information) and delay large content downloads for a later time. Similarly, multimedia streaming may only playback pre-downloaded audio/video content so as to minimize bandwidth use. For example, any content previously downloaded in the Wi-Fi VM context may be made available to watch while operating in GSM VM context. Meanwhile, when the end device 116 moves into the range of a Wi-Fi network, it may begin one or more steps to handoff from the GSM VM to the Wi-Fi VM and its network. The end device may update all previously downloaded headers with the complete content via the Wi-Fi network. Furthermore, any requested multimedia downloads may begin using the greater bandwidth available through the Wi-Fi network to complete the transaction. The multimedia download may begin automatically or may be manually triggered. In some embodiments, settings (e.g., subscriber-specific user settings) may be desired and active to limit VoIP calls to when a Wi-Fi network is available (i.e., when the Wi-Fi VM context is available) and not when executing using a GSM VM context.

For example, in an embodiment dealing with a voice call being completely handed off between two base bands, the handoff may be achieved through a series of steps. A mobile device (e.g., end user local wireless device 116) may be running a voice application on the VM 308 corresponding to the GSM base band. Moreover, while the mobile device is on a voice call, it may also be downloading the headers of e-mails over the GSM network 302.

Figure 6:
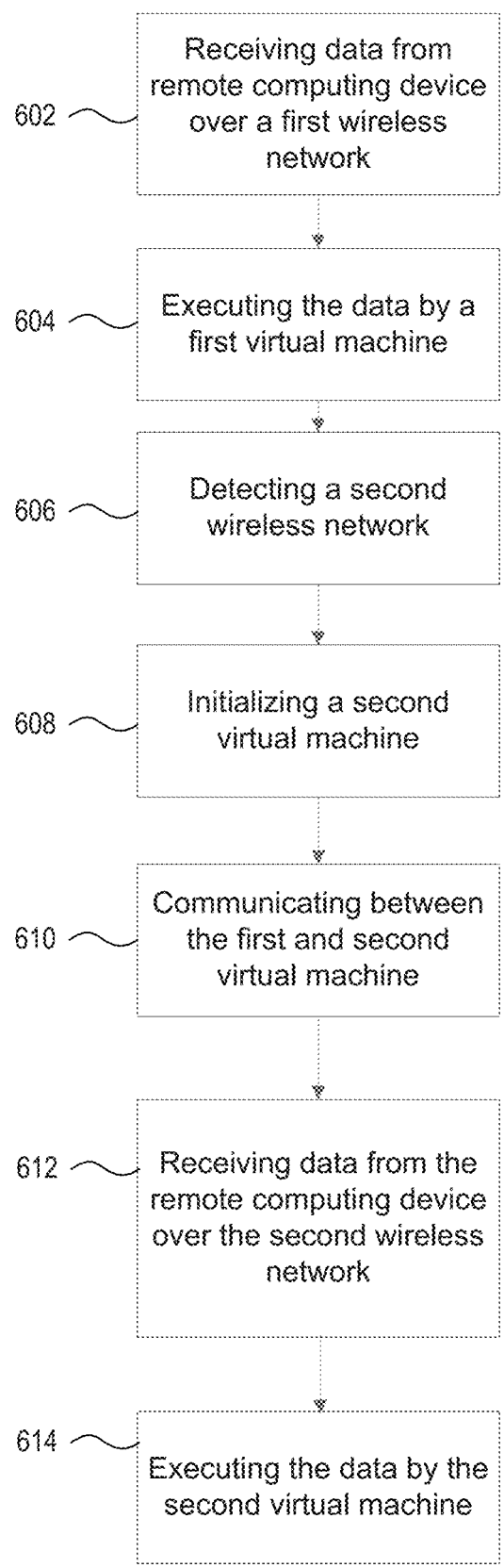
FIG. 6 illustrates a flowchart of an example method in accordance with one or more aspects of the disclosure.

In one example, a wireless device 116 may comprise a wireless receiver (e.g., GSM receiver) configured to receive over a wireless protocol (e.g., GSM protocol), and may also comprise another wireless receiver (e.g., Wi-Fi receiver) configured to receive over another wireless protocol (e.g., Wi-Fi protocol). In use, referring to the example method shown in FIG. 6, the wireless device 116 may receive (see step 602) voice data (e.g., data packets with sound bytes) from over a GSM network and to the GSM receiver. The voice data may be formatted (e.g., in a GSM-compliant protocol) to be transmitted over the GSM network.

In step 604, the voice data may be inputted for playback into the voice application running on the VM 308 corresponding to the GSM base band. The voice application may be configured to play the voice data on the user device 116 using a speaker or other output device of the user device 116. Examples of voice applications may include, but are not limited to, a media player such as an mp3 player, CD player, and other audio/video players. Likewise, voice data includes, but is not limited to, songs, mp3s, and other audio/video data.

The voice data (or other data) may be sent to the wireless device 116 from a remote computing device 103. The remote computing device may, in some embodiments, be controlled and/or operated by a network operator (e.g., a telecommunications company). The remote computing device 103 may comprise one or more servers that transmit the voice data and other data (e.g., data resulting from services) to remote devices (e.g., smartphones 116, gateways 111, etc.) The remote computing device may, in some embodiments, transmit new applications (or application updates) to the remote devices for installation and/or execution. For example, an updated version of a voice application may be downloaded and installed for execution on the VM corresponding to the GSM base band.

Meanwhile, the mobile device may come upon a Wi-Fi hotspot. The network module in the mobile device may detect (in step 606) the presence of the Wi-Fi hotspot and determine that the device is within the range of the Wi-Fi access point. The mobile device may connect (see step 608) the Wi-Fi VM 306 of its mobile virtualization platform to the Wi-Fi network 304 and execute its application context.

The GSM VM may transfer the voice call from the GSM VM into a VoIP call (or other type of IP-based call) on the Wi-Fi VM 306 with a seamless transition (see step 610) ensuring full connectivity over Wi-Fi. The remote computing device 103 may receive notification (e.g., a command) indicating that a user of the device 116 is in a Wi-Fi coverage area. The remote computing device 103 may seamlessly switch transmission of the content (i.e., voice data) from over the GSM network 302 to over the Wi-Fi network 304. Meanwhile, at the local device 116, through inter-VM communication, the session and other information for the voice application executing on the GSM VM are transitioned (in step 610) to the Wi-Fi VM. To the remote computing device and other devices, the VM transition is seamless because of the abstraction layer created by the MVP.

As a result, in step 612, the Wi-Fi VM may receive the voice data sent from the remote computing device 103 to a user premise residential device (e.g., gateway 111). The voice data may be formatted in accordance with communication over the Wi-Fi network. For example, over the Wi-Fi network 304, the voice communication may be VoIP and thus formatted accordingly. When the voice data is received at the Wi-Fi WM, it may be executed (in step 614) by a different voice application (e.g., customized for the greater bandwidth allowed by Wi-Fi communication, such as including higher quality audio or video in addition to audio) executing on the Wi-Fi VM. The transition from the first voice application (e.g., GSM baseband VM voice application) to the second voice application (e.g., Wi-Fi baseband VM voice application) may be seamless such that the playback of the voice data is uninterrupted. For example, a user of a mobile device might not experience noise (or other incomprehensible sound byte) when the seamless transition occurs. The steps shown in FIG. 6 may be performed in other than the recited order, and that one or more steps illustrated may be optional in accordance with one or more aspects of the disclosure.

In addition, the MVP may detect any headers (e.g., e-mail headers) that may have been downloaded through the GSM network 302 and attempt, through the Wi-Fi VM 306 and Wi-Fi network 304, to complete the download (e.g., attachments, large message bodies, etc.) corresponding to the headers. The downloaded information may be stored or cached in the mobile device 116 and made available for later use in the GSM VM context. Moreover, the Wi-Fi VM 306 may also download multimedia (e.g., music, video, etc.) over the Wi-Fi network 304 and store it for later use. Once the mobile device 116 moves outside of the Wi-Fi network range, the VoIP call may be transitioned to the GSM network 302 by switching to the GSM VM 308. In the GSM VM context, the mobile device 116 may access the downloaded e-mail information and any downloaded multimedia, and display the information on the device.

While the foregoing example describes the operation of the VMs in a mutually exclusive fashion, in some embodiments both VMs and both networks (i.e., GSM and Wi-Fi) may be concurrently available and used. For example, the Wi-Fi VM 306 may download content (e.g., e-mail content, multimedia content, etc.) over a Wi-Fi network 304 while another VM may consume the downloaded content. In another example, a data connection may exist on one network while a voice (e.g., VoIP) connection exists on another. It may be desired in some embodiments where both networks and both VMs coexist that the session handoff may be handled in such a way that multiple toggles between the networks may be avoided. For example, a threshold value may be used to prevent switching to another network until that network has been accessible (e.g., with at least a predetermined minimum connectivity signal strength, with any accessibility, etc.) for at least a minimum amount of times (e.g., 30 seconds, 2 minutes, etc.)

In accordance with aspects of the disclosure, authentication and/or session management may be available at a gateway level (e.g., user premises equipment and/or at the end-user device level.) For example, once a Wi-Fi client (e.g., device 115) is authenticated with a wireless gateway 111, the device 115 may be authorized to access Wi-Fi services by establishing a session with the upstream network. The session may be maintained locally at the gateway level such that the gateway 111 may proxy some or all of the traffic to the upstream network 109 and vice versa. As such, a session may be maintained for a Wi-Fi client such that it may retain session data with the gateway 111 so that it can switch between gateways without losing session. For examples, periodic re-authentication and seamless transition of session may be enabled to allow nomadic operation. In addition, the device may be authenticated with a cellular network when it is no longer in proximity to a gateway. When switching between VM contexts configured in a MVP, the session data and/or parameters may be handled such that any transition is seamless.

Figure 5:
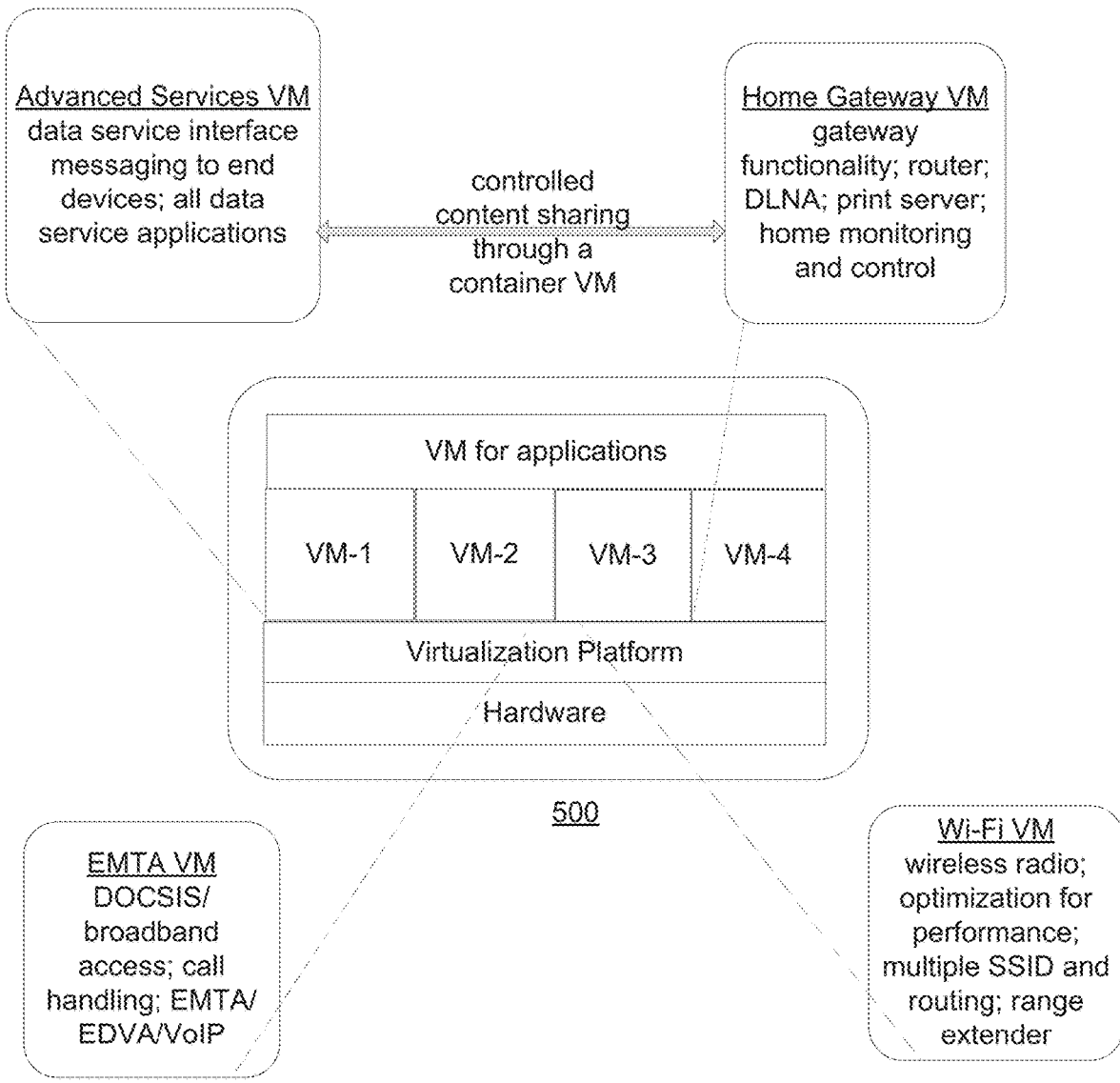
FIG. 5 shows an illustrative functional implementation of a virtual machine on gateway or comparable applications in accordance with one or more aspects of the disclosure.

In yet another example 500, an authorized service domain (e.g., such as those illustrated as "Advanced Services VM" and "EMTA VM" in FIG. 5) may be used so that applications, such as voice over IP (VoIP) code and advanced services serviced by the service/content provider may be executed by connecting to a network cloud 109 and run in the context of an authorized service domain to protect the content and copyrights. Users may be allowed to download multimedia content, stream data, access network specific features, etc. As multiple applications are executed on a single hardware platform, prevention of unauthorized data transfer becomes more complex to implement. In another example, an unauthorized service domain (e.g., such as those illustrated as "Home Gateway VM" and "Wi-Fi VM" in FIG. 5) may be used for other applications.

Authentication and authorization may be useful in regulating/controlling the access of the mobile user 116 to a wireless hotspot/gateway 111, to support some desired security considerations for using the services, and/or to guarantee minimum service level parameters and billing to the appropriate party. VMs may allow specific security features to be implemented on corresponding VMs, thus allowing only authorized data transfer and access. Wi-Fi clients may be authenticated by a variety of authentication mechanisms such as username/password, TN/PIN, personal credentials, third party provided credentials to support subscribers, and other mechanisms that enable security. The authorization to access the hotspot and service could be based on some business rules (e.g., authorize the device for all future access, one time access, authenticate via the backend for supporting seamless transition across hotspots, automatic or manual authentication, etc.) Some or all of the above authentication mechanisms may be for connection of public users to the Wi-Fi network. Since in some examples the VM may connect without user intervention, it may be desirable to not require manual authentication. The MVP and the VM context, as such, may maintain the session data providing authentication between VMs.

In addition to the content protection aspects describe herein, the VMs running in authorized service domains may be enabled to allow commands and/or control from a network cloud. Such an approach may allow a user premise gateway device 111 to receive commands from the cloud (e.g., remote computing device 103 in network cloud) and control one or more of end devices 113, 116. For example, a media player in the home network may be connected to a residential gateway 111. The VM in the access network device (ASD) may allow streaming of copyright-approved (e.g., only those songs that a profile associated with the ASD indicates have copyright permission for playback) media from the cloud to the device, but through security features, other services/content may be blocked. In another example, a gateway device (e.g., set top box) at a user's home may request media streamed from the cloud from an internet protocol (IP) content source (e.g., a website that provides video clips). In those cases where a device that is not in the access network (i.e., non-ASD) desires services from the cloud, the VM from the non-ASD may communicate with devices and/or services that are available for non-ASD devices. In yet another example, devices 116, 113 may be registered for a service for a specific user account. As such, it may be possible to allow communication and service rendering between ASD and registered non-ASD devices alike.

In accordance with various aspects of the disclosure, a remote computing device 103 may store profiles (e.g., user profiles) for each user/user device and use these profiles for authentication and/or session management. Authentication credentials may be used to regulate access to VMs and to monitor/control the devices and applications. Access to the VMs also may be controlled based on the profile. For example, a profile may be used in initiating applications and/or driver download/updates from the network cloud to the VM in user premise equipment (e.g., gateway 111) or to end user devices 112-117.

A user may initially register with a remote content provider system 103. This registration may be initiated in various manners. If an application or content is downloaded to an end device 116 from gateway 111 after the end device enters the gateway service domain, an installation routine could be configured to automatically begin a registration process once application installation is completed. If the application was previously installed on an end device prior to that end device entering the gateway service domain, registration might begin when a user activates the application and/or when the end device automatically activates the application. As part of registration, authentication of the end device 116 and/or of a user associated with device 116 may be desired. Such authorization can be performed using one or more of the methods described above, or other known methods of authentication. Authentication could alternatively or additionally include, e.g., use of a mobile telephone number associated with an end device.

In some embodiments, no additional billing procedures may be needed for communication sessions involving devices (such as smartphone 116) that might be temporarily associated with a particular local network gateway 111. In other embodiments (e.g., where a local network gateway is operated by, e.g., a commercial establishment), it may be desirable to provide separate billing for sessions involving such temporarily associated devices. As one example, an operator of network 109 or of local network gateway 111 might require that a user of device 116 agree to pay for data usage through local network gateway 111 and to provide a credit card number or make other arrangements to facilitate such billing. When the user of device 116 establishes a communication session through gateway 111, a billing record may be generated and transmitted to a billing server at system 103. A variety of billing methods may be supported to adhere to desired business rules, such as transaction based billing, one time access, unlimited access, billing for third party subscriber access, etc. In one example, based on the type of each network connected and/or used, the billing records may be updated accordingly. For example, each VM corresponding to a baseband may maintain a record of transactions, and this information may sent to the upstream network (e.g., billing server at system 103) for computation of a final billing amount and summary.

In some embodiments, a user may login from multiple end devices and update, either concurrently or sequentially, their user profile from those devices. The latest update on the profile may then be updated by an account management system and/or synchronized across the end devices. For updating the profile, in some examples, the remote computing system 103 in the network cloud may auto-detect the end device 116 based on user credentials and provide a user interface for profile updates. The user profile stored by an account management system may be device agnostic and maintained at the upstream network and/or may be derived from multiple devices to deliver multiple services (e.g., the user may use a network based profile and access the identities and content from any device for any service). For example, a user profile may purchase a software application, and indication of the software application purchase may be recorded on the user's profile. That application may be downloaded to a mobile device 116 and executed by an appropriate virtual machine on the device. Meanwhile, that software application may also be downloaded and executed on a virtual machine on the user's television 112. A network operator of system 103 may authenticate a user device, identify a user profile corresponding to the device, and permit access to authorized software application purchases. In one example, a song purchased on using a mobile device 116 may be registered to the user's profile. Subsequently, the song may be authorized, through verification against the user profile, for playback using an appropriate software application (e.g., a media player) running on a virtual machine on a user's television 112. In that example media content (e.g., music, songs, video, eBooks, etc.) may be recorded on a user's profile to allow device agnostic access to the media content.

In accordance with various aspects of the disclosure, user premise equipment (e.g., wireless gateway 111) may include content aggregation features to allow sharing of digital contents, such as photos, music, videos, eBooks, etc., though consumer electronics 112, personal computers 114, mobile devices 116, etc. inside and beyond the home. Home network device interoperability may integrate personal computers (PC), consumer communication electronics (CE) and mobile devices with the Internet, broadcast, and/or mobile networks to provide an environment where consumers may connect and enjoy various types of media on their products. Such a system creates an interoperable network where end user devices communicating with each other using a single network may send and receive data as they require. The content aggregation application services may be controlled by (e.g., interact with) various virtual machines so that desired content protection mechanisms may be implemented, and only those devices in the authorized service domain or home network are accessible and indexed. One skilled in the art will appreciate after review of the entirety disclosed herein that while some examples describe communication between VMs in the same device, the system contemplated by this disclosure also includes transfer between a VM in a device to a VM in another device. For example, a user may be playing a game (e.g., computer game program) on her smartphone while commuting home, but once inside her home, she may wish to continue playing the game on her game station (or other electronic device) connected to a television 112. As such, the application may be downloaded (or pre-downloaded) to the electronic device (e.g., game station) in the home and executed to transfer gameplay from the smartphone to the electronic device in accordance with the various aspects described herein. An MVP enables the gameplay to transition from an application executing on the virtual machine on the smartphone to an application executing on another virtual machine in the game station in the home.

For example, in one embodiment, a mobile device 116 with a mobile virtualization platform (MVP) may include two VMs. The MVP may be configured to synchronize the local storage data of a user from one VM context to another VM context. This includes, but is not limited to, bookmarks, preferences, media content, and other data. In addition to data, in some embodiments, applications may also be synchronized between VMs. For example, an application (e.g., an address book application) may be downloaded/installed in one VM context and could then be used in another VM context. In addition, in some embodiments, data may be locally cached (e.g., on tangible memory of a mobile device) and used between VM contexts. For example, emails may be downloaded while in a Wi-Fi VM context, but may be cached and accessible when a mobile device is on-the-go and operating on a cellular (e.g., GSM, 3G, etc.) VM context. Such a seamless transition (e.g., sharing) may occur without requiring re-initiation of the download from the other VM context.

Figure 4:
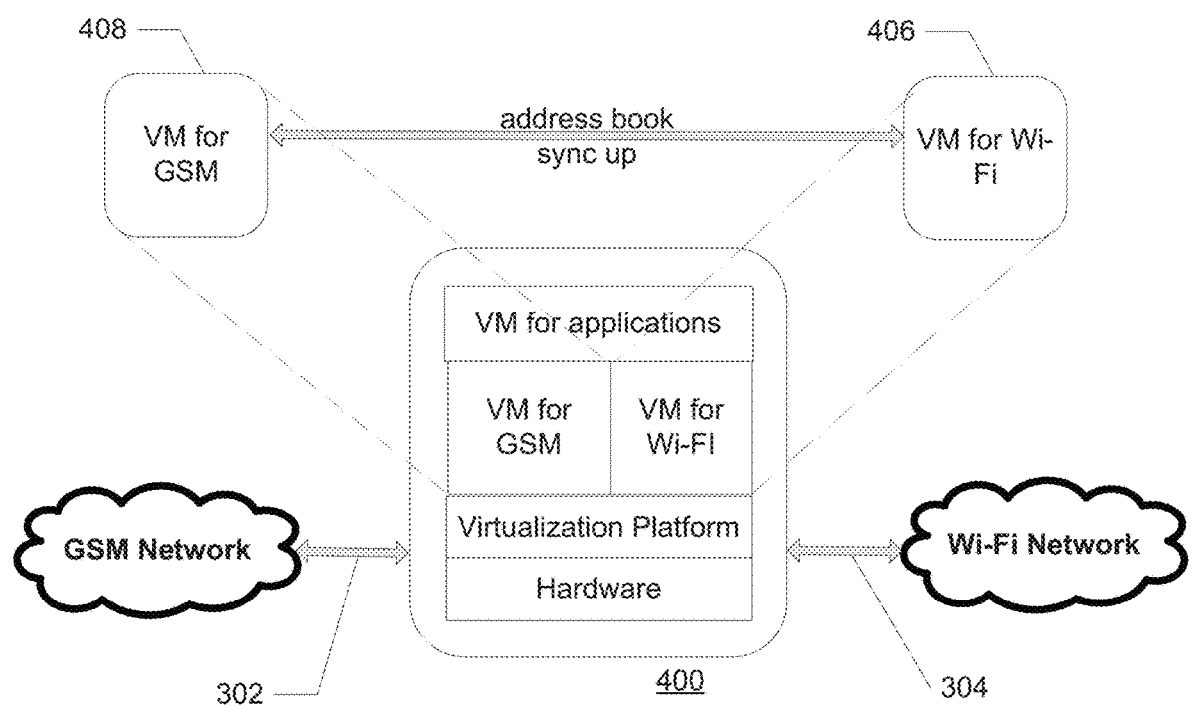
FIG. 4 illustrates another functional block diagram of communication between various components of an MVP in accordance with one or more aspects of the disclosure.

In the example illustrated in FIG. 4, two VMs in a MVP 400 of a mobile device 116 are shown. The VMs of the GSM network 302 and the Wi-Fi network 304 are part of a virtualization platform (i.e., MVP). This MVP may be responsible for the synchronization of an address book application and associated content. For example, a smartphone 116 may comprise a local address book application and some content stored in the smartphone's memory. Meanwhile, an application server 107 may also remotely maintain some address book contact data. The application server 107 may also store instructions executable by one or more processors in the server to carry out operations such as are described herein.

While running an address book application in a cellular VM context (e.g., GSM VM context 408), the VM may rely primarily on address book content (e.g., phone number, contact name, street address, e-mail address, notes, etc.) stored locally on the smartphone 116. For example, in this context, the application may display the complete contact list with just names. The application may communicate over the network 302 to retrieve contact information that is not locally stored (e.g., on application server 107). The application, being run in a GSM VM context 408, may retrieve this additional information only as desired by the user (e.g., by a manual request from the user) or as requested by software processes executing on the smartphone (e.g., another application that requires the particular contact information details for a contact whose detailed information is not locally stored on the phone.) As such, in the GSM VM context 408, the usage of the network is minimized.

Meanwhile, in a higher-bandwidth environment (e.g., Wi-Fi VM context 406), the complete contact details from a network address book (e.g., an address book stored at remote computing device 103) may be downloaded to the user device 116. For example, when a mobile device moves from a GSM network 302 to a Wi-Fi network 304, the system 400 automatically may download the network contact details from the Internet into the local phonebook. The MVP 400 may be responsible for synchronizing the local address book such that if the device 116 transitions back to the GSM VM context 408, then the particular VM is synchronized with the Wi-Fi VM and the downloaded content is available in the new context. As a result, network usage on the GSM network 302 is reduced because large data/content/application downloads may be deferred to times when the Wi-Fi VM context 406 is executing the address book application.

As used in the example of FIG. 4, a "contact" may refer to a specific person, business or other entity with which a user or some service might wish to communicate. Contact data may include information identifying the contact such as a name (e.g., a person's or business's name), a street or other physical address, etc. Contact data may also include information needed to establish communication with the contact. Examples of this information include one or more TNs, an email address, an IM address, a gaming handle, etc. One or more fields of a data record holding contact data may hold information indicating a particular "buddy list" identifier or other user identifier for a contact.

Although the example of FIG. 4 discusses downloading address book content from a network cloud (e.g., remote computing system 103) to a local mobile device 116, the system contemplated by the disclosure is operable to upload contact information from the mobile device to the network cloud, as well as other address book operations. In addition, the applications may download and/or upload other types of content. For example, e-mail headers and/or contents/attachments of e-mails may be downloaded based on the VM context in which VM context the application is executing.

In one embodiment in accordance with aspects of the disclosure, it may be desirable for applications executed on a MVP to undergo regression testing and certification to ensure compatibility with different hardware and application functionality. With each application tested in a VM context, that application may be independently deployed using some or all gateway resources to provide high efficacy and with less turn around time.

A residential gateway 111 may support a MVP that multiple application-specific or service-specific modules that allow a myriad of applications to concurrently access the gateway 111. The MVP may prioritize application requests and downloads/uploads to spool resources appropriately. Thus when two applications executing on devices (e.g., smartphone 116 and laptop 115) communicating with a gateway 111 request firmware upgrade from the upstream cloud nearly simultaneously, or two applications request content download from a Wi-Fi network concurrently, a VM priority may be used to allow seamless process continuity. For example, requests related to a voice call may be assigned a higher priority than data requests for content that is not occurring live (e.g., a pre-stored video on the Internet.)

In one example in accordance with aspects of the disclosure, expansion modules for providing additional features may be implemented by adding VMs to an existing gateway 111. For example, the expansion module/component may be implemented through additional hardware boards or USB-based expansion modules added to a gateway 111. New features may be added to the modified gateway by sending a VM with a predetermined configuration. The VM may execute applications or program instructions that take advantage of the new features available to the gateway 111. For example, this may allow new features and services to the market such as home monitoring and control, high-definition radio, etc.

In some embodiments, a mobile device (e.g., laptop 115) may be equipped with an automatic locator (e.g., GPS receiver) that updates the location of the device when nomadic. Periodic network tracking may be enabled to discover the presence of a wireless LAN (e.g., a Wi-Fi network) when in its vicinity. When a GSM/CDMA/3G mobile device 116 connects to a public Wi-Fi network, its location may be updated in the location database so that the user can be correctly located for emergency services such as E911. The VM of the cellular baseband may share the location details with the Wi-Fi VM.

In some embodiments in accordance with aspects of the disclosure, a gateway 111 may manage/handle device driver and firmware upgrades. In alternate embodiments, a remote content provider system 103 may maintain drivers and firmware/software upgrades/patches at a network cloud and may initiate downloading of drivers/etc. to the downstream MVP directly. In one example, the downstream MVP may be a virtualization platform installed on a gateway 111 or other user premise equipment. In another example, the downstream MVP may be a virtualization platform installed on user devices (e.g., smartphone 116, laptop 115, television 112, etc.) The remote content provider system 103 may communicate with the MVP of a remote device and download/update as desired. As such, a network operator may, through the remote content provider system 103, offer end-to-end services for new and existing features. In addition, in some examples, the downloading/updating may be automatically scheduled for particular maintenance windows (e.g., during odd hours when usage is lower) or may be initiated by an authorized profile from the home (e.g., through a graphical user interface on a television 112, or other interface). At least one benefit of such a system is a reduced storage of large data and firmware information in the gateway 111 related to each application, thus allowing the VM of a mobile device to act as an independent component. The gateway 111 may continue to be used for storing application settings and/or for communication with the upstream network (e.g., system 103).

Numerous benefits may be experienced by a system implementing one or more aspects of the MVP disclosed herein. For example, a MVP that uses one or more virtual machines for each available baseband may allow for segregation of applications and fine tuning of the applications based on network capabilities (e.g., a WiFi network may allow greater bandwidth usage than a 3G network). Another benefit, in some embodiments, may be found in that application development and launching may be done irrespective of hardware specification/modification and/or operating systems because of the MVP. For example, multiple virtual machines may enable the deploying of each application independently without re-certification of monolithic code and dynamic update of software, thus saving time and effort in testing and certification. In addition, in some examples the MVP may allow for a profile-based management for monitoring and controlling devices (e.g., mobile device 116, gateway 111, etc.) Furthermore, support for network expansion modules may be improved because of the ability, in some embodiments, to deliver support without changing gateway code allowing a service provider to launch new application. All embodiments need not necessarily achieve all objects or advantages identified above. It will also be appreciated and understood that modifications may be made without departing from the true spirit and scope of the present disclosure. Any and all permutations of various features described herein are within the scope of the disclosure. The description is thus to be regarded as illustrative instead of restrictive on the present disclosure.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. The foregoing description is not intended to be exhaustive or to limit embodiments to the precise form disclosed, and modifications and variations are possible in light of the above teachings or may be acquired from practice of various embodiments. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps shown in the illustrative figures may be performed in other than the recited order, and that one or more steps illustrated may be optional in accordance with aspects of the disclosure.

What is claimed is:

1. A method comprising:
   receiving, by a wireless device via a first wireless network, a first portion of a media content item;
   processing, based on application data in a first virtualization component of the wireless device, the first portion;
   communicating, from the first virtualization component and to a second virtualization component, and based on detecting a second wireless network, the application data;
   receiving, by the wireless device via the second wireless network, a second portion of the media content item; and
   processing, based on the application data in the second virtualization component of the wireless device, the second portion.

2. The method of claim 1, wherein the first virtualization component comprises a first virtual machine and the second virtualization component comprises a second virtual machine.

3. The method of claim 1, wherein the first virtualization component comprises a first container and the second virtualization component comprises a second container.

4. The method of claim 1, wherein the processing of the first portion causes playback of the first portion of the media content item, wherein the processing of the second portion causes playback of the second portion of the media content item, and wherein an uninterrupted transition is between the playback of the first portion of the media content item and the playback of the second portion of the media content item.

5. The method of claim 1, wherein before the processing of the second portion of the media content item, the method comprises:

receiving, by the wireless device, the second virtualization component, wherein the second virtualization component is associated with the second wireless network; and installing the second virtualization component on the wireless device, wherein the first virtualization component and the second virtualization component enable the wireless device to concurrently run multiple operating systems.

6. The method of claim 1, wherein the communicating is further based on at least one of:
   a determination that data access speed via the second wireless network is greater than data access speed via the first wireless network;
   a determination that cost per unit sent via the second wireless network is less than cost per unit sent via the first wireless network; or
   a determination that the second wireless network comprises a short-range wireless network and the first wireless network comprises a cellular network.

7. The method of claim 1, wherein the media content item comprises audio data associated with a voice service, and wherein the application data comprises session data associated with the voice service.

8. The method of claim 1, wherein:
   processing the first portion comprises storing, by the first virtualization component, the application data in a local cache associated with the wireless device, and
   processing the second portion comprises accessing, by the second virtualization component, the local cache.

9. The method of claim 1, wherein the media content item comprises audio data for voice communications initiated via the first virtualization component and continued via the second virtualization component.

10. The method of claim 1, wherein the media content item comprises data for a game for which play occurs via the first virtualization component during a first time period and for which play continues via the second virtualization component during a second time period.

11. The method of claim 1, wherein the first portion of the media content item comprises a first portion of an electronic address book and the second portion of the media content item comprises a second portion of the electronic address book.

12. The method of claim 1, wherein:
   the processing of the first portion the media content item occurs via the first virtualization component during a first time period,
   the processing of the second portion the media content item occurs via the second virtualization component during a second time period, and
   the second portion of the media content item comprises a continuation of the first portion of the media content item.

13. An apparatus comprising:
   one or more processors; and
   memory storing executable instructions that, when executed by the one or more processors, cause the apparatus to:
      receive, via a first wireless network, a first portion of a media content item;
      process, based on application data in a first virtualization component of the apparatus, the first portion;
      communicate, from the first virtualization component and to a second virtualization component, and based on detecting a second wireless network, the application data;
      receive, via the second wireless network, a second portion of the media content item; and
      process, based on the application data in the second virtualization component of the apparatus, the second portion.

14. The apparatus of claim 13, wherein the first virtualization component comprises a first virtual machine and the second virtualization component comprises a second virtual machine.

15. The apparatus of claim 13, wherein the first virtualization component comprises a first container and the second virtualization component comprises a second container.

16. The apparatus of claim 13, wherein the executable instructions, when executed by the one or more processors, cause the apparatus to process the first portion by causing the apparatus to playback the first portion of the media content item and cause the apparatus to process the second portion by causing the apparatus to playback the second portion of the media content item, and wherein an uninterrupted transition is between the playback of the first portion of the media content item and the playback of the second portion of the media content item.

17. The apparatus of claim 13, wherein the executable instructions, when executed by the one or more processors, cause the apparatus to, before the processing of the second portion:
   receive the second virtualization component, wherein the second virtualization component is associated with the second wireless network; and
   install the second virtualization component on the apparatus, wherein the first virtualization component and the second virtualization component enable the apparatus to concurrently run multiple operating systems.

18. The apparatus of claim 13, wherein the executable instructions, when executed by the one or more processors, cause the apparatus to:
   communicate the application data further based on at least one of:
      a determination that data access speed via the second wireless network is greater than data access speed via the first wireless network;
      a determination that cost per unit sent via the second wireless network is less than cost per unit sent via the first wireless network; or
      a determination that the second wireless network comprises a short-range wireless network and the first wireless network comprises a cellular network.

19. The apparatus to claim 13, wherein the media content item comprises audio data associated with a voice service, and wherein the application data comprises session data associated with the voice service.

20. The apparatus of claim 13, wherein the executable instructions, when executed by the one or more processors, cause the apparatus to:
   process the first portion by storing, by the first virtualization component, the application data in a local cache associated with the apparatus; and
   process the second portion by accessing, by the second virtualization component, the local cache.

21. A system comprising:
   a first wireless interface associated with a first wireless network;
   a second wireless interface associated with a second wireless network; and
   a computing device comprising:
      one or more processors, and memory storing executable instructions that, when executed by the one or more processors, cause the computing device to:
- receive, via the first wireless interface and the first wireless network, a first portion of a media content item;
- process, based on application data in a first virtualization component of the computing device, the first portion;
- communicate, from the first virtualization component and to a second virtualization component, and based on detecting the second wireless network, the application data;
- receive, via the second wireless interface and the second wireless network, a second portion of the media content item; and
- process, based on the application data in the second virtualization component of the computing device, the second portion.

22. The system of claim 21, wherein the first virtualization component comprises a first virtual machine and the second virtualization component comprises a second virtual machine.

23. The system of claim 21, wherein the first virtualization component comprises a first container and the second virtualization component comprises a second container.

24. The system of claim 21, wherein the executable instructions, when executed by the one or more processors, cause the computing device to process the first portion by causing the computing device to playback the first portion of the media content item and cause the computing device to process the second portion by causing the computing device to playback the second portion of the media content item, and wherein an uninterrupted transition is between the playback of the first portion of the media content item and the playback of the second portion of the media content item.

25. The system of claim 21, wherein the executable instructions, when executed by the one or more processors, cause the computing device to, before the processing of the second portion:
- receive the second virtualization component, wherein the second virtualization component is associated with the second wireless network; and
- install the second virtualization component on the computing device, wherein the first virtualization component and the second virtualization component enable the computing device to concurrently run multiple operating systems.

26. The system of claim 21, wherein the executable instructions, when executed by the one or more processors, cause the computing device to:
- communicate the application data further based on at least one of:
  - a determination that data access speed via the second wireless network is greater than data access speed via the first wireless network;
  - a determination that cost per unit sent via the second wireless network is less than cost per unit sent via the first wireless network; or
  - a determination that the second wireless network comprises a short-range wireless network and the first wireless network comprises a cellular network.

27. The system of claim 21, wherein the executable instructions, when executed by the one or more processors, cause the computing device to:
- process the first portion by storing, by the first virtualization component, the application data in a local cache associated with the computing device; and
- process the second portion by accessing, by the second virtualization component, the local cache.

* * * * *